United States Patent
Venkataraman et al.

(10) Patent No.: US 7,707,818 B2
(45) Date of Patent: May 4, 2010

(54) EXHAUST STACKS AND POWER GENERATION SYSTEMS FOR INCREASING GAS TURBINE POWER OUTPUT

(75) Inventors: Saravanan Nattanmai Venkataraman, Chennai Tamilnadu (IN); Shinoj Vakkayil Chandrabose, Thrissur Kerala (IN)

(73) Assignee: General Electric Company, Schenectady, NY (US)

(*) Notice: Subject to any disclaimer, the term of this patent is extended or adjusted under 35 U.S.C. 154(b) by 90 days.

(21) Appl. No.: 12/029,162

(22) Filed: Feb. 11, 2008

(65) Prior Publication Data

US 2009/0199558 A1    Aug. 13, 2009

(51) Int. Cl.
    F02C 7/08    (2006.01)
(52) U.S. Cl. .................... 60/39.5; 181/213
(58) Field of Classification Search .......... 60/39.5, 60/39.182; 181/213, 217–218, 224–225; 110/184, 160, 162
    See application file for complete search history.

(56) References Cited

U.S. PATENT DOCUMENTS

| | | | |
|---|---|---|---|
| 2,641,233 A * | 6/1953 | Hemenway et al. | 122/240.1 |
| 3,704,762 A | 12/1972 | Smith et al. | |
| 3,739,872 A | 6/1973 | McNair | |
| 3,769,795 A | 11/1973 | Rostrom | |
| 4,050,237 A | 9/1977 | Pall et al. | |
| 4,207,864 A | 6/1980 | Fischer et al. | |
| 4,274,256 A | 6/1981 | Kalt et al. | |
| 4,328,666 A | 5/1982 | Cummins, Jr. | |
| 4,353,206 A | 10/1982 | Lee | |
| 4,353,207 A | 10/1982 | Lee | |
| 4,748,805 A | 6/1988 | Rigault et al. | |
| 4,800,715 A * | 1/1989 | Conway | 60/39.5 |
| 5,174,113 A * | 12/1992 | Deville | 60/309 |
| 5,279,358 A | 1/1994 | Hannis | |
| 5,347,806 A | 9/1994 | Nakhamkin | |
| 5,396,760 A * | 3/1995 | Hines | 60/39.511 |
| 5,471,020 A * | 11/1995 | Kelsall et al. | 181/224 |
| 5,551,165 A | 9/1996 | Turner et al. | |

(Continued)

FOREIGN PATENT DOCUMENTS

EP    0539067 A1    4/1993

(Continued)

*Primary Examiner*—Michael Cuff
*Assistant Examiner*—Phutthiwat Wongwian
(74) *Attorney, Agent, or Firm*—Cantor Colburn LLP (57) ABSTRACT

An exhaust stack having a junction tube and a flue is provided. The flue has a silencer portion, a converging duct portion, a tubular portion, and a diverging diffuser portion. The silencer portion fluidly communicates with the junction tube. The silencer portion has a first hydraulic mean cross-sectional flow path, and the tubular portion has a second hydraulic mean cross-sectional flow path less than or equal to the first hydraulic mean cross-sectional flow path. The converging duct portion is coupled between the silencer portion and the tubular portion. The diverging diffuser portion is coupled to an end of the tubular portion opposite to the converging duct portion, such that exhaust gases flowing through the junction tube, the silencer portion, the converging duct portion, the tubular portion and the diverging diffuser portion have a reduced overall pressure drop, at least in part due to the diverging diffuser portion and the second hydraulic mean cross-sectional flow path being less than or equal to the first hydraulic mean cross-sectional flow path.

18 Claims, 6 Drawing Sheets

U.S. PATENT DOCUMENTS

| | | |
|---|---|---|
| 5,569,073 A | 10/1996 | Cooper |
| 5,711,821 A | 1/1998 | Turner et al. |
| 5,839,455 A | 11/1998 | Turner et al. |
| 5,927,063 A | 7/1999 | Janda et al. |
| 6,146,137 A | 11/2000 | Vogel |
| 6,442,941 B1 | 9/2002 | Anand et al. |
| 6,460,325 B2 | 10/2002 | Liebig et al. |
| 6,543,234 B2 | 4/2003 | Anand et al. |
| 6,721,649 B2 | 4/2004 | Knott et al. |
| 6,807,803 B2 | 10/2004 | Poccia et al. |
| 6,912,856 B2 | 7/2005 | Morgan et al. |
| 7,100,357 B2 | 9/2006 | Morgan et al. |
| 2001/0032455 A1 | 10/2001 | Liebig et al. |
| 2002/0129608 A1 | 9/2002 | Anand et al. |
| 2003/0000220 A1 | 1/2003 | Liebig et al. |
| 2004/0258520 A1 | 12/2004 | Parry |
| 2005/0114010 A1 | 5/2005 | Healy et al. |
| 2005/0257514 A1 | 11/2005 | Morgan et al. |
| 2005/0268594 A1 * | 12/2005 | Kurihara et al. ......... 60/39.182 |
| 2005/0268595 A1 * | 12/2005 | Steyer et al. ................ 60/204 |
| 2007/0031238 A1 | 2/2007 | Fujii et al. |

FOREIGN PATENT DOCUMENTS

| | | |
|---|---|---|
| EP | 1186761 A2 | 3/2002 |
| EP | 1533573 A1 | 5/2005 |
| JP | 60045720 | 3/1985 |
| JP | 63208624 | 8/1988 |
| JP | 2204636 | 8/1990 |
| JP | 4321705 | 11/1992 |
| JP | 5340267 | 12/1993 |
| JP | 6193465 | 7/1994 |
| JP | 8296410 | 11/1996 |
| JP | 10159575 | 6/1998 |
| JP | 2000320308 | 11/2000 |
| JP | 2001271611 | 10/2001 |
| JP | 2005155622 | 6/2005 |

* cited by examiner

EXHAUST STACKS AND POWER GENERATION SYSTEMS FOR INCREASING GAS TURBINE POWER OUTPUT

BACKGROUND OF THE INVENTION

The present application relates generally to gas turbines, and more specifically to exhaust stacks and power generation systems configured to increase the power output of gas turbines.

A combined cycle power plant ("CCPP") includes a gas turbine, a heat recovery steam generator ("HRSG"), a steam turbine and an exhaust stack. The gas turbine includes a turbine configured to produce a rotational power output in response to an expansion of exhaust gases. The HRSG is configured to receive the exhaust gases from the gas turbine and generate steam from heat of the exhaust gases. The steam turbine is configured to produce a rotational power output in response to an expansion of the steam. The exhaust stack is configured to pass the exhaust gases from the HRSG to the atmosphere.

The gas turbine includes a compressor, a combustion region and the turbine. The compressor is configured to compress an inflow of air. The combustion region is configured to receive the compressed air, combust a mixture of the compressed air and fuel, and produce a high temperature, high pressure exhaust gases. The turbine is configured to receive the exhaust gases and rotate in response to the expansion of the exhaust gases. Accordingly, the rotational power output of the turbine is proportional to the expansion of the exhaust gases and inherent pressure drop.

Accordingly, it is desirable to provide an exhaust stack configured to reduce the local pressure drop through the exhaust stack, such that the expansion of the exhaust gases in the gas turbine is increased and hence the power output of the gas turbine is increased.

BRIEF DESCRIPTION OF THE INVENTION

An exhaust stack in accordance with an exemplary embodiment is provided. The exhaust stack includes a junction tube. The exhaust stack further includes a flue having a silencer portion, a converging duct portion, a tubular portion, and a diverging diffuser portion. The silencer portion fluidly communicates with the junction tube. At least a portion of the silencer portion has a first hydraulic mean cross-sectional flow path, and at least a portion of the tubular portion has a second hydraulic mean cross-sectional flow path less than or equal to the first hydraulic mean cross-sectional flow path. The converging duct portion is coupled between the silencer portion and the tubular portion. The diverging diffuser portion is coupled to an end of the tubular portion opposite to the converging duct portion, such that exhaust gases flowing through the junction tube, the silencer portion, the converging duct portion, the tubular portion and the diverging diffuser portion, has a reduced localized pressure drop, at least in part due to the diverging diffuser portion, and the second hydraulic mean cross-sectional flow path being less than or equal to the first hydraulic mean cross-sectional flow path.

A power generation system in accordance with another exemplary embodiment is provided. The power generation system includes a gas turbine having a compressor, a combustion region and a turbine. The compressor is configured to compress air. The combustion region is configured to receive the compressed air from the compressor and combust a mixture of the compressed air and fuel, which produces exhaust gases. The turbine is configured to receive the exhaust gases from the combustion region and rotate in response to an expansion of the exhaust gases, such that a pressure of the exhaust gases decreases as the exhaust gases expands through the turbine. The power generation system further includes a heat recovery steam generator configured to receive the exhaust gases and generate steam from heat of the exhaust gases. The power generation system further includes an exhaust stack having a junction tube and a flue. The junction tube is configured to receive the exhaust gases from the heat recovery steam generator. The flue has a silencer portion, a converging duct portion, a tubular portion, and a diverging diffuser portion. The silencer portion fluidly communicates with the junction tube. At least a portion of the silencer portion has a first hydraulic mean cross-sectional flow path, and at least a portion of the tubular portion has a second hydraulic mean cross-sectional flow path less than or equal to the first hydraulic mean cross-sectional flow path. The converging duct portion is coupled between the silencer portion and the tubular portion. The diverging diffuser portion is coupled to an end of the tubular portion opposite to the converging duct portion, such that exhaust gases flowing through the junction tube, the silencer portion, the converging duct portion, the tubular portion and the diverging diffuser portion, has a reduced localized pressure drop, at least in part due to the diverging diffuser portion, and the second hydraulic mean cross-sectional flow path being less than or equal to the first hydraulic mean cross-sectional flow path. The reduced localized pressure drop in the exhaust stack increases the overall pressure differential of the exhaust gases across the turbine and hence increases the power output of the gas turbine.

An exhaust stack in accordance with another exemplary embodiment is provided. The exhaust stack includes a junction tube. The exhaust stack further includes a flue having a first tubular portion, a first diverging diffuser portion, a silencer portion, a converging duct portion, a second tubular portion, and a second diverging diffuser portion. The first tubular portion fluidly communicates with the junction tube. At least a portion of the first tubular portion has a first hydraulic mean cross-sectional flow path, and at least a portion of the silencer portion has a second hydraulic mean cross-sectional flow path. The first hydraulic mean cross-sectional flow path is less than or equal to the second hydraulic mean cross-sectional flow path. The first diverging diffuser portion is coupled between the first tubular portion and the silencer portion. At least a portion of the second tubular portion has a third hydraulic mean cross-sectional flow path less than or equal to the second hydraulic mean cross-sectional flow path. The converging duct portion is coupled between the silencer portion and the second tubular portion. The second diverging diffuser portion is coupled to an end of the second tubular portion opposite to the converging duct portion, such that exhaust gases flowing through the junction tube, the first tubular portion, the first diverging diffuser portion, the silencer portion, the converging duct portion, the second tubular portion and the second diverging diffuser portion, have a reduced localized pressure drop, at least in part due to the second diverging diffuser portion, and the third hydraulic mean cross-sectional flow path being less than or equal to the second hydraulic mean cross-sectional flow path.

A power generation system in accordance with another exemplary embodiment is provided. The power generation system includes a gas turbine having a compressor, a combustion region and a turbine. The compressor is configured to compress air. The combustion region is configured to receive the compressed air from the compressor and combust a mixture of the compressed air and fuel which produces exhaust gases. The turbine is configured to receive the exhaust gases from the combustion region and rotate in response to an expansion of the exhaust gases, such that a pressure of the exhaust gases decreases as the exhaust gases expands through the turbine. The power generation system further includes a heat recovery steam generator configured to receive the exhaust gases and generate steam from heat of the exhaust gases. The power generation system further includes an exhaust stack having a junction tube and a flue. The junction tube is configured to receive the exhaust gases from the heat recovery steam generator. The flue has a first tubular portion, a first diverging diffuser portion, a silencer portion, a converging duct portion, a second tubular portion, and a second diverging diffuser portion. The first tubular portion fluidly communicates with the junction tube. At least a portion of the first tubular portion has a first hydraulic mean cross-sectional flow path. At least a portion of the silencer portion has a second hydraulic mean cross-sectional flow path. The first hydraulic mean cross-sectional flow path is less than or equal to the first hydraulic mean cross-sectional flow path. The first diverging diffuser portion is coupled between the first tubular portion and the silencer portion. At least a portion of the second tubular portion has a third hydraulic mean cross-sectional flow path less than or equal to the second hydraulic mean cross-sectional flow path. The converging duct portion is coupled between the silencer portion and the second tubular portion. The second diverging diffuser portion is coupled to an end of the second tubular portion opposite to the converging duct portion, such that exhaust gases flowing through the junction tube, the first tubular portion, the first diverging diffuser portion, the silencer portion, the converging duct portion, the second tubular portion and the second diverging diffuser portion have a reduced overall pressure drop, at least in part due to the second diverging diffuser portion, and the third hydraulic mean cross-sectional flow path being less than or equal to the second hydraulic mean cross-sectional flow path.

DETAILED DESCRIPTION OF THE INVENTION

Exemplary embodiments are directed to an exhaust stack configured to increase a power output of a gas turbine of a combined cycle power plant ("CCPP"). However, it is contemplated that the exhaust stack can increase the power output of gas turbines integrated in other suitable power generation systems. In these exemplary embodiments, the exhaust stack is configured to reduce the pressure drop in the exhaust stack in order to increase the pressure drop associated with the expansion of the exhaust gases in the gas turbine, such that the increased expansion of gas increases the power output of the gas turbine.

Figure 1:
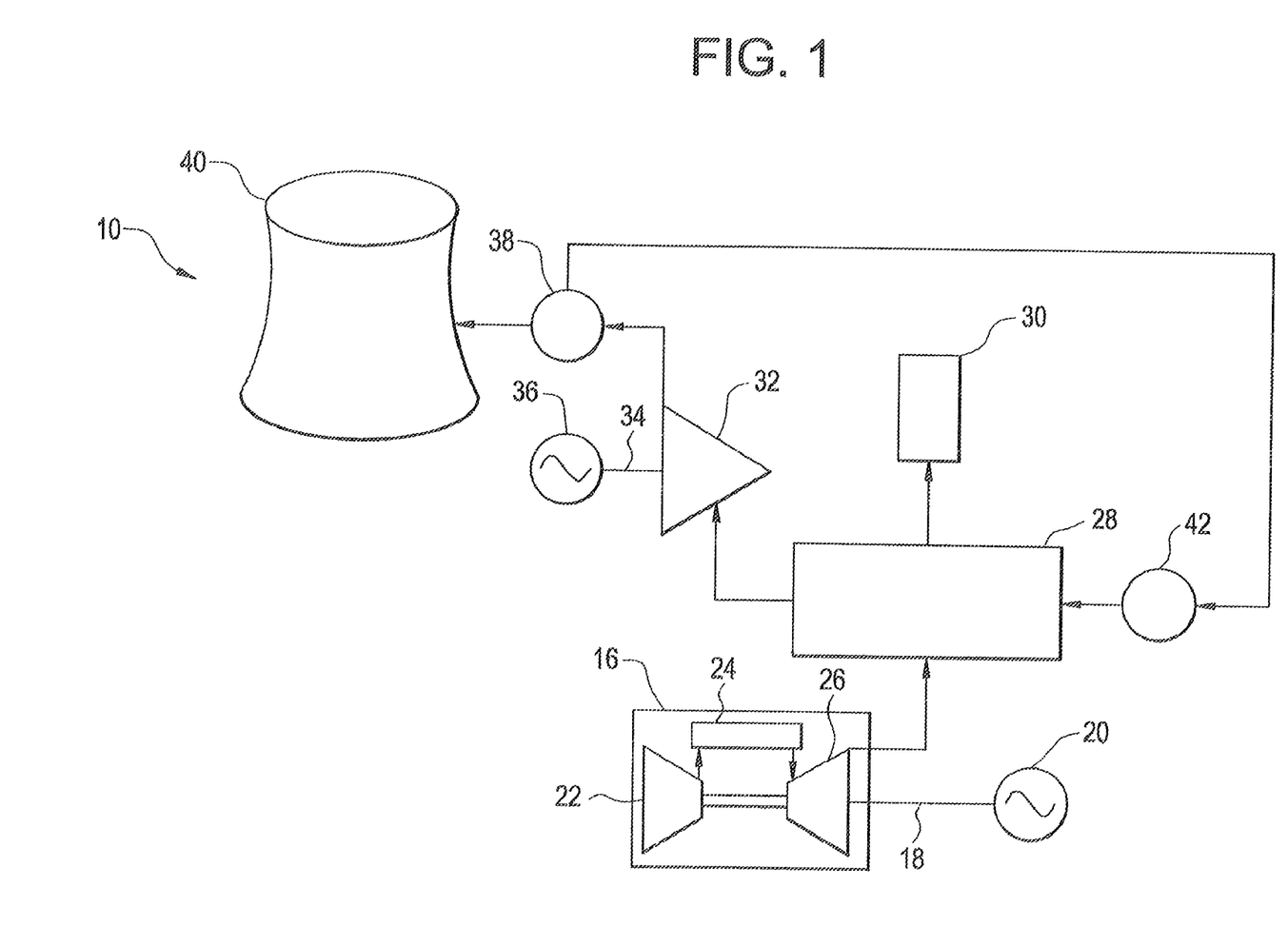
FIG. 1 is a schematic of a combined cycle power generation system having an exhaust stack, in accordance with an exemplary embodiment.
Figure 2:
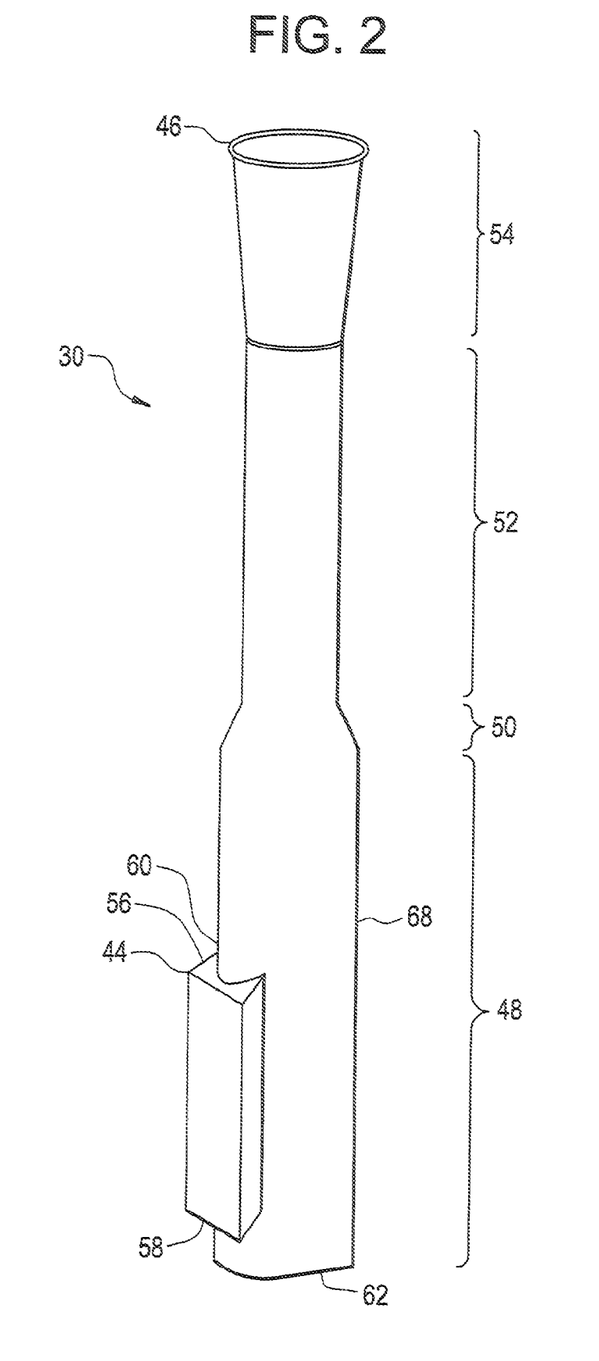
FIG. 2 is a perspective view of the exhaust stack of FIG. 1.
Figure 3:
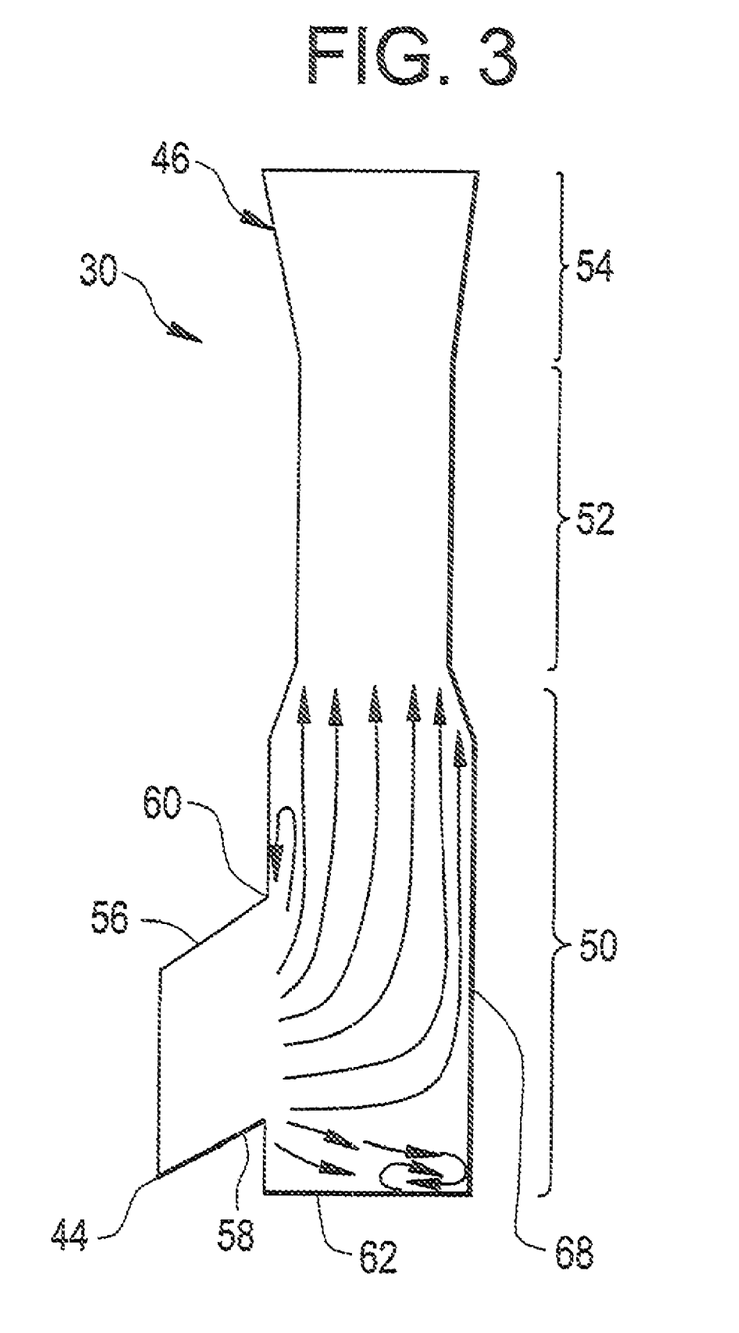
FIG. 3 is a flow profile for the exhaust stack of FIG. 2.

Referring to FIG. 1, a CCPP 10 includes a gas turbine generator 12 and a steam turbine generator 14. The gas turbine generator 12 is configured to generate electricity and produce exhaust gases. The steam turbine generator 14 is configured to receive the exhaust gases from the gas turbine generator 12 and generate additional electricity from waste heat of the exhaust gases.

The gas turbine generator 12 includes a gas turbine 16, a first output shaft 18 and a first electrical generator 20. The gas turbine 16 has a compressor 22, a combustion region 24 and a turbine 26. The compressor 22 is configured to compress an inflow of air. The combustion region 24 is configured to receive the compressed air from the compressor 22 and combust a mixture of the compressed air and fuel, which produces a high pressure, high temperature exhaust gases. The turbine 26 is configured to receive the exhaust gases from the combustion region 24 and rotate in response to an expansion of the exhaust gases. The turbine 26 is operably connected to the first electrical generator 20 by the first output shaft 18 for providing rotational power to the first electrical generator 20 and producing electricity. The turbine 26 is further configured to pass the exhaust gases to the steam turbine generator 14.

The steam turbine generator 14 includes a HRSG 28 and an exhaust stack 30. The HRSG 28 is configured to receive the exhaust gases from the gas turbine 16 and generate steam from the waste heat of the exhaust gases. The exhaust stack 30 is configured to pass the exhaust gases from the HRSG 28 to the atmosphere and reduce the local pressure drop of the exhaust gases in the stack and increase the overall pressure differential across the turbine, as described in detail below.

The steam turbine generator 14 further includes a steam turbine 32, a second output shaft 34, a second electrical generator 36, a condenser 38, a cooling tower 40 and a pump 42. The steam turbine 32 is configured to receive the steam from the HRSG 28 and rotate in response to the expansion of steam. The steam turbine 32 is operably connected to the second electrical generator 36 by the second output shaft 34 for providing rotational power to the second electrical generator 36 and generating electricity. However, it is contemplated that the steam turbine 32 can instead be operably connected to the first electrical generator 20 by the first output shaft 18 in a single shaft arrangement. The condenser 38 is configured to receive the steam from the steam turbine 32 and condense the steam into water. In particular, the condenser 38 is configured to receive water from the cooling tower 40 and transfer heat from the steam to the water and condense the steam into water. It is contemplated that the condenser 38 can instead be configured to transfer heat to water from a lake, river, sea or other suitable non-limiting examples. The pump 42 is configured to pump water from the condenser 38 into the HRSG 28.

Referring to FIGS. 2-5, the exhaust stack 30 includes a junction tube 44 and a flue 46. The junction tube 44 is configured to fluidly communicate with the HRSG 28. The flue 46 includes a silencer portion 48, a converging duct portion 50, a tubular portion 52 and a diverging diffuser portion 54. The silencer portion 48 is configured to fluidly communicate with the junction tube 44. At least a portion of the silencer portion 48 has a first hydraulic mean cross-sectional flow path, and at least a portion of the tubular portion 52 has a second hydraulic mean cross-sectional flow path less than or equal to the first hydraulic mean cross-sectional flow path. The converging duct portion 50 is coupled between the silencer portion 48 and the tubular portion 52. The diverging diffuser portion 54 is coupled to an end of the tubular portion 52 opposite to the converging duct portion 50. Accordingly, the exhaust gases flowing through the junction tube 44, the silencer portion 48, the converging duct portion 50, the tubular portion 52 and the diverging diffuser portion 54, have a reduced overall pressure drop at least in part due to the diverging diffuser portion 54 and the second hydraulic mean cross-sectional flow path being less than or equal to the first hydraulic mean cross-sectional flow path.

Figure 4:
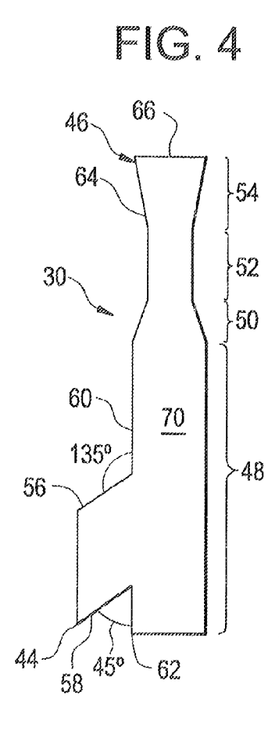
FIG. 4 is a cross-sectional view of the exhaust stack of FIG. 2.

Referring to FIG. 4, the junction tube 44 has a top surface 56 and a bottom surface 58 extending from an outer surface 60 of the silencer portion 48, such that the junction tube 44 provides a uniform flow distribution into the silencer portion 48 for reducing a localized pressure drop into the silencer portion. In particular, the top surface 56 extends from the outer surface 60 of the silencer portion 48 by 135 degrees, and the bottom surface 58 extends from the outer surface 60 by 45 degrees. Accordingly, the junction tube 44 directs the exhaust gases through the silencer portion 48 towards the converging duct portion 50, with a substantially uniform flow profile for reducing pressure drop in the silencer section. In this regard, the junction tube 44 also reduces a turning loss at a closed end 62 of the silencer portion 48 and enhances the pressure recovery in the diverging diffuser portion 54.

It is contemplated that the top surface 56 and the bottom surface 58 of the junction tube 44 can extend from the outer surface 60 of the silencer portion 48 by various suitable angles, as exemplified in the embodiments of FIGS. 6-9.

Figure 5:
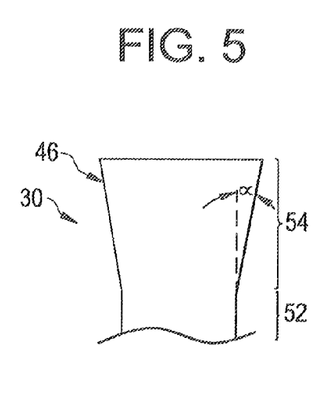
FIG. 5 is an enlarged cross-sectional view of a diverging diffuser portion of the exhaust stack of FIG. 2.

Referring to FIG. 5, the diverging diffuser portion 54 is configured to diverge from the tubular portion 52, such that the diverging diffuser portion 54 recovers exit pressure loss. Examples of a divergence angle α include 5 degrees, 15 degrees and suitable angles in the range therebetween, in order to recover pressure in the range between about 1.5 and 2.0 centimeters of water for a velocity range between about 18 and about 22 meters per second. It is contemplated that the divergence angle can be greater or less than this range, utilizing a suitable pressure recovery device.

The diverging diffuser portion 54 further includes a first end 64 with a diameter of 6 meters and a second end 66 with a diameter of 9 meters. It is understood that the diameters of the first end 64 and second end 66 can be greater or less than 6 and 9 meters, respectively. The diverging diffuser portion 54 has a length of 15 meters from the first end 64 to the second end 66. However, the diverging diffuser portion 54 can have a length greater or less than 15 meters.

Figures 6, 7:
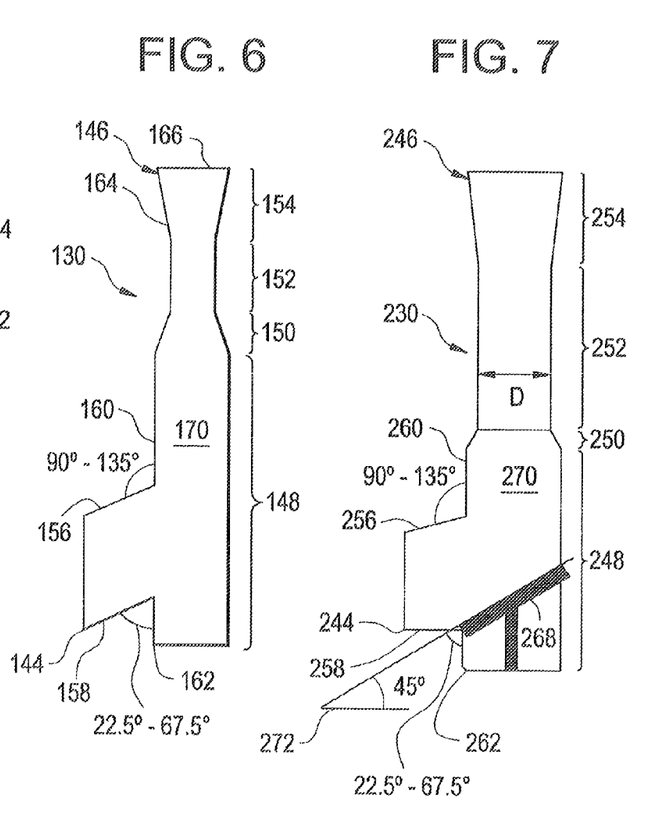
FIG. 6 is a cross-sectional view of an exhaust stack showing a top surface of a junction tube extending from a silencer portion by an angle within a range between about 90 and about 135 degrees, and a bottom surface of the junction tube extending from the silencer portion by an angle within a range between about 22.5 and about 67.5 degrees, in accordance with another exemplary embodiment.
FIG. 7 is a cross-sectional view of an exhaust stack showing a top surface of a junction tube extending from a silencer portion by an angle within a range between about 90 and about 135 degrees, a bottom surface of the junction tube extending from the silencer portion by an angle within a range between about 22.5 and about 67.5 degrees, and a flow guider having a planar surface positioned at an angle within a range between about 22.5 and about 67.5 degrees from a lateral axis 272 of the exhaust stack, in accordance with yet another exemplary embodiment.

Referring to FIG. 6, an exhaust stack 130 having a junction tube 144 and a flue 146 with a silencer portion 148, a converging duct portion 150, a tubular portion 152 and a diverging diffuser portion 154, is substantially similar to the exhaust stack 30 having the junction tube 44 and the flue 46 with the silencer portion 48, the converging duct portion 50, the tubular portion 52 and the diverging diffuser portion 54 of FIGS. 1-4. However, the junction tube 144 has a top surface 156 that can extend from an outer surface 160 of the silencer portion 148 by an angle within the range between about 90 and about 135 degrees. In addition, the junction tube 144 has a bottom surface 158 that extends from the outer surface 160 by an angle within a range between about 22.5 and about 67.5 degrees.

Referring to FIG. 7, an exhaust stack 230 having a junction tube 244 and a flue 246 with a silencer portion 248, a converging duct portion 250, a tubular portion 252 and an diverging diffuser portion 254 is substantially similar to the exhaust stack 30 respectively having the junction tube 44 and the flue 46 with the silencer portion 48, the converging duct portion 50, the tubular portion 52 and the diverging diffuser portion 54 of FIGS. 1-4. However, the junction tube 244 has a top surface 256 that extends from the outer surface 260 by an angle within the range between about 90 and about 135 degrees. Moreover, the junction tube 244 has a bottom surface 258 that extends from the outer surface 260 by an angle within a range between about 22.5 and about 67.5 degrees. Furthermore, the flue 246 further includes a flow guider 268 configured to reduce turning loss at a closed end 262 of the silencer portion 248 and to provide a substantially uniform velocity flow profile upstream of silencer portion 248 and diffuser portion 246. The flow guider 268 is a plate having a planar surface extending from the bottom surface 258 of the silencer portion 248 and across a cavity 270 of the silencer portion 248. The planar surface of the flow guider 268 is positioned at an angle within a range between about 22.5 and about 67.5 degrees from a lateral axis 272 of the flue 246. In that regard, a significant portion of exhaust gases is directed away from the closed end 262 of the silencer portion 248 and towards the converging duct portion 250.

The silencer portion 248 is configured to allow for the expansion of the exhaust gases and reduce the velocity and the turbulence of the exhaust gases, such that high energy noise is dissipated in the silencer portion 248. The silencer portion 248 is configured to have a first mean velocity of exhaust gases flowing therethrough and the tubular portion 252 is configured to have a second mean velocity of exhaust gases flowing therethrough. The first mean velocity is equal to at least one-half the second mean velocity.

Figure 8:
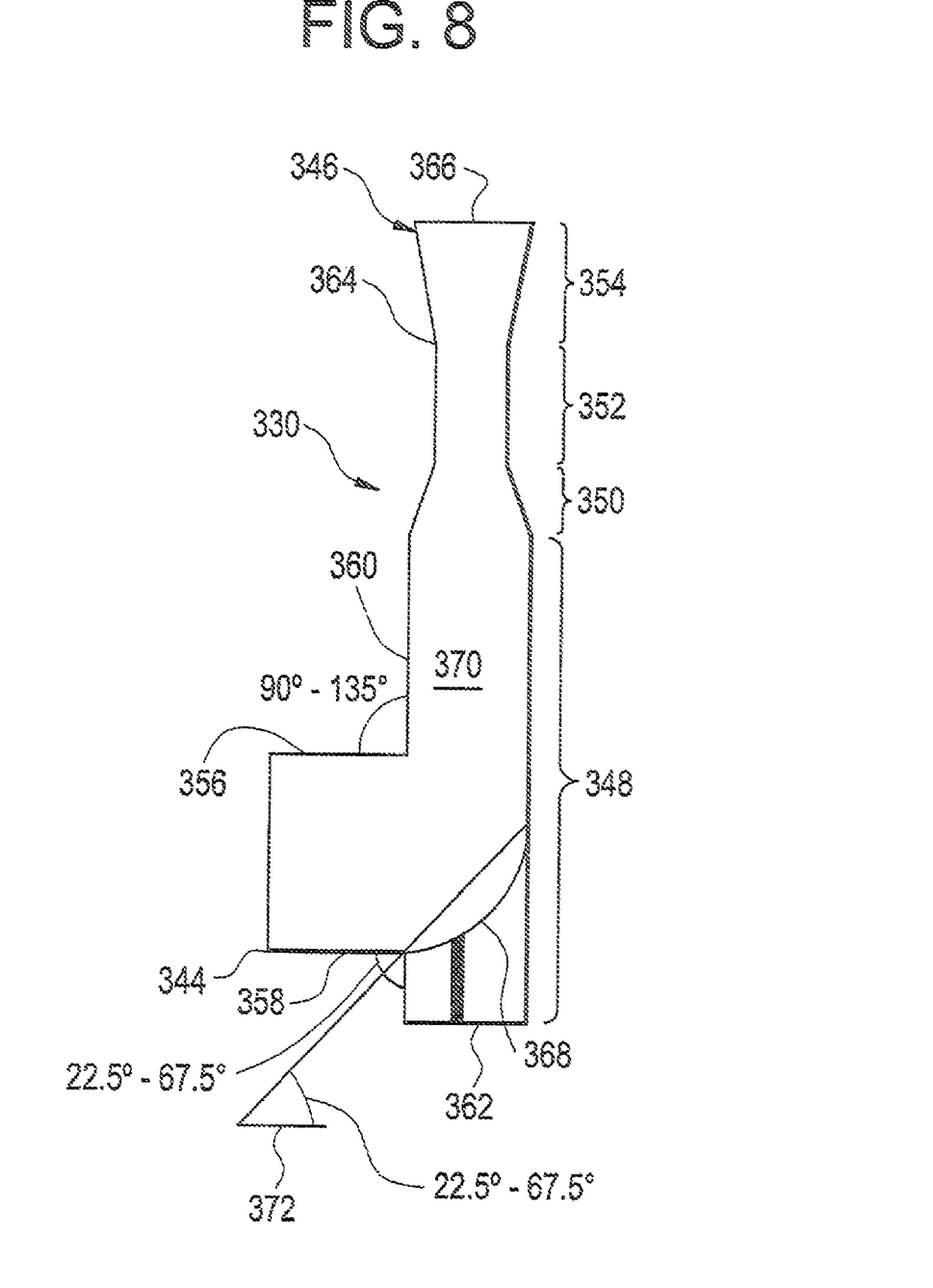
FIG. 8 is a cross-sectional view of an exhaust stack showing a top surface of a junction tube extending from a silencer portion by an angle within a range between about 90 and about 135 degrees, a bottom surface of the junction tube extending from the silencer portion by an angle within a range between about 22.5 and about 67.5 degrees, and a flow guider having a concave surface extending from a lateral axis of the exhaust stack by an angle within a range between about 22.5 and about 67.5 degrees, in accordance with another exemplary embodiment.

Referring to FIG. 8, an exhaust stack 330 having a junction tube 344 and a flue 346 with a silencer portion 348, a converging duct portion 350, a tubular portion 352 and an diverging diffuser portion 354, is substantially similar to the exhaust stack 30 having the junction tube 44 and the flue 46 with the silencer portion 48, the converging duct portion 50, the tubular portion 52 and the diverging diffuser portion 54 of FIGS. 1-4. However, the junction tube 344 has a top surface 356 that extends from an outer surface 360 of the silencer portion 348 by an angle within a range between about 90 and about 135 degrees. In addition, the junction tube 344 has a bottom surface 358 that extends from the outer surface 360 by an angle within a range between about 22.5 and about 67.5 degrees. Furthermore, the flue 346 further includes a flow guider 368 configured to reduce turning loss at a closed end 362 of the silencer portion 348 and provide substantially uniform velocity profile at the silencer inlet and diffuser inlet section ensuring maximum pressure recovery. The flow guider 368 is a plate having a concave surface extending from the bottom surface 358 of the silencer portion 348 and across a cavity 370 of the silencer portion 348. The concave surface has a radius of curvature equal to one-half of the first diameter of the silencer portion 48. However, the concave surface can instead have other suitable radii of curvatures. The flow guider 368 is positioned at an angle within a range between about 22.5 and about 67.5 degrees from a lateral axis 372 of the flue 346.

Figure 9:
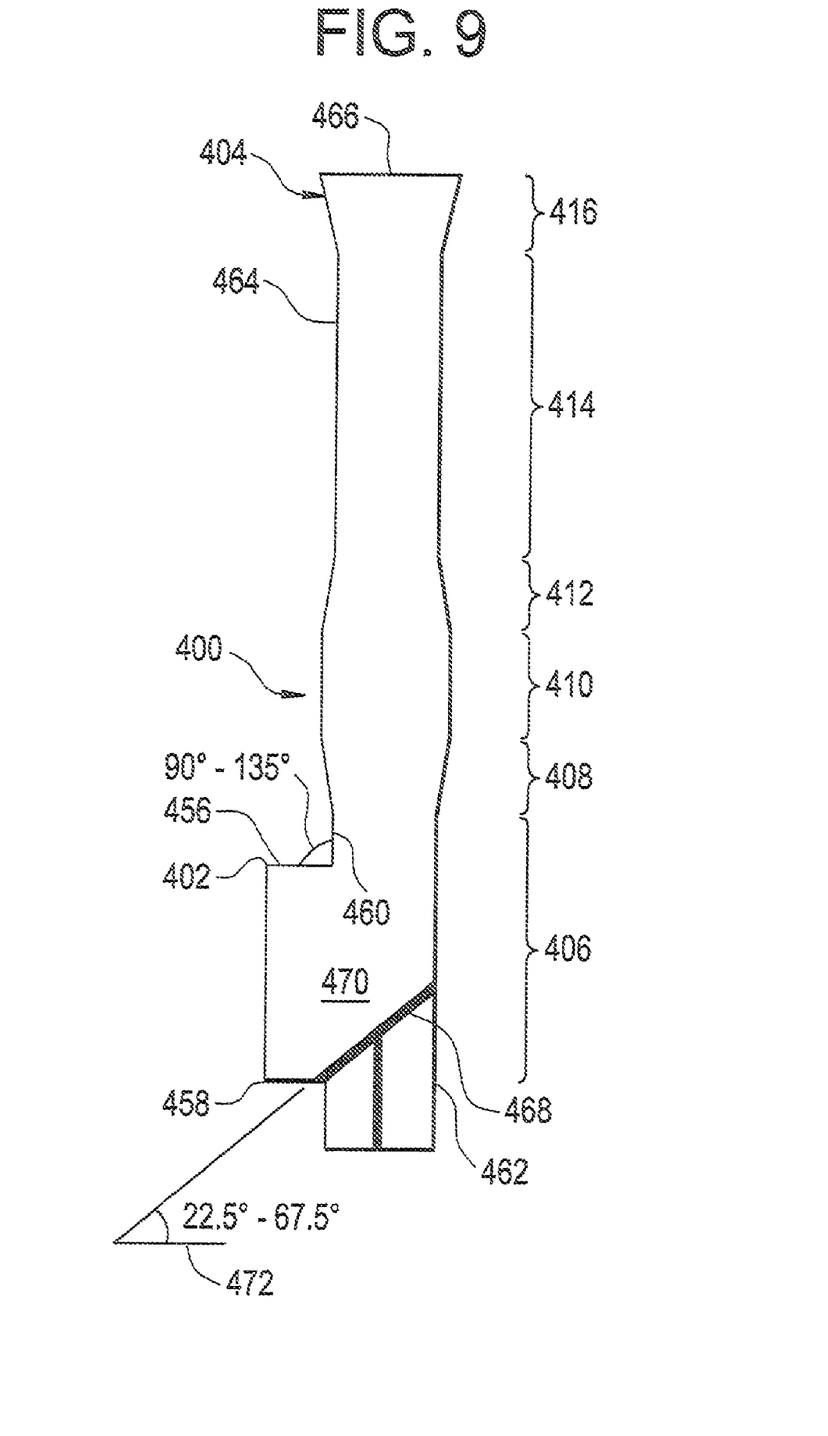
FIG. 9 is a cross-sectional view of an exhaust stack, in accordance with another exemplary embodiment.

Referring to FIG. 9, an exhaust stack 400 is configured to limit the pressure drop of the exhaust gases to approximately 0.5 inches of water. In particular, the exhaust stack 400 includes a junction tube 402 and a flue 404. The junction tube 402 fluidly communicates with the HRSG 28 and is configured to receive steam from the HRSG 28. The flue 404 includes a first tubular portion 406, a first diverging diffuser portion 408, a silencer portion 410, a converging duct portion 412, a second tubular portion 414, and a second diverging diffuser portion 416. The first tubular portion 406 fluidly communicates with the junction tube 402. The first tubular portion 406 has a first hydraulic mean cross-sectional flow path, and the silencer portion 410 has a second hydraulic mean cross-sectional flow path. The first hydraulic mean cross-sectional flow path is less than or equal to the second hydraulic mean cross-sectional flow path. The first diverging diffuser portion 408 is coupled between the first tubular portion 406 and the silencer portion 410. The second tubular portion 414 has a third hydraulic mean cross-sectional flow path less than or equal to the second hydraulic mean cross-sectional flow path. The converging duct portion 412 is coupled between the silencer portion 410 and the second tubular portion 414. The second diverging diffuser portion 416 is coupled to an end of the second tubular portion 414 opposite to the converging duct portion 412, such that exhaust gases flowing through the junction tube 402, the first tubular portion 406, the first diverging diffuser portion 408, the silencer portion 410, the converging duct portion 412, the second tubular portion 414 and the second diverging diffuser portion 416 has a reduced overall pressure drop, at least in part due to the second diverging diffuser portion and the third hydraulic mean cross-sectional flow path being less than or equal to the second hydraulic mean cross-sectional flow path. The reduced localized stack pressure drop increases an overall pressure differential of the exhaust gases through the gas turbine 16 and increases a power output of the gas turbine 16.

The first tubular portion 406, silencer portion 410 and second tubular portion 414 are configured to have first, second, and third mean velocities, respectively, of exhaust gases flowing therethrough. The first mean velocity is at least equal to an average of the second and third mean velocities. Further, the second mean velocity is equal to at least one-half the third mean velocity. The silencer portion 410 is further configured to allow for the expansion of the exhaust gases and reduce the velocity and the turbulence of the exhaust gases, such that high-energy noise is dissipated in the silencer portion 410.

The flue 404 further includes a flow guider 468 configured to reduce turning loss at a closed end 462 of the silencer portion 410 and to provide a substantially uniform velocity profile upstream of the silencer section and diffuser section. The flow guider 468 is a plate having a planar surface extending from the bottom surface 462 of the silencer portion 410 and across a cavity 470 of the silencer portion 410. The flow guider 468 is positioned at an angle within the range of about 22.5 degrees and about 67.5 degrees from a lateral axis 472 of the flue 404.

The exhaust stacks and methods described herein provide a substantial advantage over other devices and methods. In particular, the exhaust stacks provide a technical effect of reducing a pressure drop of exhaust gases and increasing an amount of power output by a gas turbine. In one exemplary embodiment, the terms hydraulic mean cross-sectional flow path refers to a mean or average cross-sectional size of a flow path.

While the invention has been described with reference to an exemplary embodiment, various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

We claim:

1. An exhaust stack, comprising:
a junction tube configured to receive exhaust gases from a heat recovery steam generator (HRSG); and
a flue having a silencer portion, a converging duct portion, a tubular portion, and a diverging diffuser portion, the silencer portion fluidly communicating with the junction tube, at least a portion of the silencer portion having a first hydraulic mean cross-sectional flow path, at least a portion of the tubular portion having a second hydraulic mean cross-sectional flow path less than or equal to the first hydraulic mean cross-sectional flow path, the converging duct portion being coupled between the silencer portion and the tubular portion, the diverging diffuser portion being coupled to an end of the tubular portion opposite to the converging duct portion, such that exhaust gases flowing through the junction tube, the silencer portion, the converging duct portion, the tubular portion and the diverging diffuser portion have a reduced overall pressure drop, at least in part due to the diverging diffuser portion, and the second hydraulic mean cross-sectional flow path being less than or equal to the first hydraulic mean cross-sectional flow path.

2. The exhaust stack of claim 1, wherein the silencer portion is configured to have a first mean velocity of exhaust gases that is substantially equal to one-half of a second mean velocity of exhaust gases in the tubular portion.

3. The exhaust stack of claim 1, wherein the junction tube has a top surface and a bottom surface, the top surface extending between about 90 and about 135 degrees from an outer surface of the silencer portion, the bottom surface extending between about 45 and about 90 degrees from the outer surface of the silencer portion such that the exhaust gases have a substantially uniform velocity profile through the flue.

4. The exhaust stack of claim 1, further comprising a flow guider configured to extend from a bottom surface of the junction tube and across the silencer portion, causing a substantially uniform velocity profile of exhaust gases flowing into the silencer portion and the diverging diffuser portion.

5. The exhaust stack of claim 4, wherein the flow guider comprises a plate offset at least about 20 degrees from a lateral axis of the flue.

6. The exhaust stack of claim 4, wherein the flow guider comprises a plate having one of a planar surface and a concave surface.

7. The exhaust stack of claim 6, wherein the concave surface of the flow guider has a radius of curvature equal to at least one-half of the first hydraulic mean cross-sectional flow path of the silencer portion.

8. The exhaust stack of claim 1, wherein the diverging diffuser portion is configured to diverge from the tubular portion by a predetermined divergence angle within a range between about 5 and about 15 degrees.

9. A power generation system, comprising:
a gas turbine having a compressor, a combustion region and a turbine, the compressor being configured to compress air, the combustion region being configured to receive the compressed air from the compressor and combust a mixture of the compressed air and fuel which produces exhaust gases, and the turbine being configured to receive the exhaust gases from the combustion region and rotate in response to an expansion of the exhaust gases, such that a pressure of the exhaust gases decreases as the exhaust gases expands through the turbine;
a heat recovery steam generator configured to receive the exhaust gases and generate steam from heat of the exhaust gases; and
an exhaust stack having a junction tube and a flue, the junction tube being configured to receive the exhaust gases from the heat recovery steam generator, the flue having a silencer portion, a converging duct portion, a tubular portion, and a diverging diffuser portion, the silencer portion fluidly communicating with the junction tube, at least a portion of the silencer portion having a first hydraulic mean cross-sectional flow path, at least a portion of the tubular portion having a second hydraulic mean cross-sectional flow path less than or equal to the first hydraulic mean cross-sectional flow path, the converging duct portion being coupled between the silencer portion and the tubular portion, the diverging diffuser portion being coupled to an end of the tubular portion opposite to the converging duct portion, such that exhaust gases flowing through the junction tube, the silencer portion, the converging duct portion, the tubular portion and the diverging diffuser portion have a reduced local pressure drop, at least in part due to the diverging diffuser portion, and the second hydraulic mean cross-sectional flow path being less than or equal to the first hydraulic mean cross-sectional flow path, the reduced local pressure drop increasing an overall pressure differential of the exhaust gases through the turbine and increasing an amount of power output of the gas turbine.

10. The power generation system of claim 9, wherein the silencer portion is configured to have a first mean velocity of exhaust gases that is substantially equal to one-half of a second mean velocity of exhaust gases in the tubular portion.

11. The power generation system of claim 9, wherein the junction tube has a top surface and a bottom surface, the top surface extending between about 90 and about 135 degrees from an outer surface of the silencer portion, the bottom surface extending between about 45 and about 90 degrees from the outer surface of the silencer portion, such that the exhaust gases have a substantially uniform velocity profile through the flue.

12. The power generation system of claim 9, further comprising a flow guider configured to extend from a bottom surface of the junction tube and across the silencer portion, causing a substantially uniform velocity profile of exhaust gases flowing into the silencer portion and the diverging diffuser portion.

13. An exhaust stack, comprising:
a junction tube configured to receive exhaust gases from a heat recovery steam generator (HRSG); and
a flue having a first tubular portion, a first diverging diffuser portion, a silencer portion, a converging duct portion, a second tubular portion, and a second diverging diffuser portion, the first tubular portion fluidly communicating with the junction tube, at least a portion of the first tubular portion having a first hydraulic mean cross-sectional flow path, at least a portion of the silencer portion having a second hydraulic mean cross-sectional flow path, the first hydraulic mean cross-sectional flow path being less than or equal to the first hydraulic mean cross-sectional flow path, the first diverging diffuser portion being coupled between the first tubular portion and the silencer portion, at least a portion of the second tubular portion having a third hydraulic mean cross-sectional flow path less than or equal to the second hydraulic mean cross-sectional flow path, the converging duct portion being coupled between the silencer portion and the second tubular portion, the second diverging diffuser portion being coupled to an end of the second tubular portion opposite to the converging duct portion, such that exhaust gases flowing through the junction tube, the first tubular portion, the first diverging diffuser portion, the silencer portion, the converging duct portion, the second tubular portion and the second diverging diffuser portion have a reduced overall pressure drop, at least in part due to the second diverging diffuser portion, and the third hydraulic mean cross-sectional flow path being less than or equal to the second hydraulic mean cross-sectional flow path.

14. The exhaust stack of claim 13, wherein the first tubular portion is configured to have a first mean velocity of exhaust gases, the silencer portion configured to have a second mean velocity of exhaust gases, and the second tubular portion configured to have a third mean velocity of exhaust gases, such that the first mean velocity is equal to an average of the second mean velocity and the third mean velocity.

15. The exhaust stack of claim 14, wherein the third mean velocity is less than or equal to twice the second mean velocity.

16. A power generation system, comprising:
a gas turbine having a compressor, a combustion region and a turbine, the compressor being configured to compress air, the combustion region being configured to receive the compressed air from the compressor and combust a mixture of the compressed air and fuel which produces exhaust gases, and the turbine being configured to receive the exhaust gases from the combustion region and rotate in response to an expansion of the exhaust gases, such that a pressure of the exhaust gases decreases as the exhaust gases expands through the turbine;
a heat recovery steam generator configured to receive the exhaust gases and generate steam from heat of the exhaust gases; and
an exhaust stack having a junction tube and a flue, the junction tube being configured to receive the exhaust gases from the heat recovery steam generator, the flue having a first tubular portion, a first diverging diffuser portion, a silencer portion, a converging duct portion, a second tubular portion, and a second diverging diffuser portion, the first tubular portion fluidly communicating with the junction tube, at least a portion of the first tubular portion having a first hydraulic mean cross-sectional flow path, at least a portion of the silencer portion having a second hydraulic mean cross-sectional flow path, the first hydraulic mean cross-sectional flow path being less than or equal to the first hydraulic mean cross-sectional flow path, the first diverging diffuser portion being coupled between the first tubular portion and the silencer portion, at least a portion of the second tubular portion having a third hydraulic mean cross-sectional flow path less than or equal to the second hydraulic mean cross-sectional flow path, the converging duct portion being coupled between the silencer portion and the second tubular portion, the second diverging diffuser portion being coupled to an end of the second tubular portion opposite to the converging duct portion, such that exhaust gases flowing through the junction tube, the first tubular portion, the first diverging diffuser portion, the silencer portion, the converging duct portion, the second tubular portion and the second diverging diffuser portion have a reduced overall pressure drop, at least in part due to the second diverging diffuser portion, and the third hydraulic mean cross-sectional flow path being less than or equal to the second hydraulic mean cross-sectional flow path.

17. The power generation system of claim 16, wherein the first tubular portion is configured to have a first mean velocity of exhaust gases, the silencer portion configured to have a second mean velocity of exhaust gases, and the second tubular portion configured to have a third mean velocity of exhaust gases, such that the first mean velocity is equal to an average of the second mean velocity and the third mean velocity.

18. The power generation system of claim 16, wherein the third mean velocity is less than or equal to twice the second mean velocity.

* * * * *